Aug. 3, 1965     J. R. STAPLETON     3,198,496
MIX PUMPING ATTACHMENT FOR FROZEN CONFECTION FREEZERS
Filed Oct. 8, 1962     2 Sheets-Sheet 1

Johnny R. Stapleton
INVENTOR.

Johnny R. Stapleton
INVENTOR.

United States Patent Office 3,198,496
Patented Aug. 3, 1965

3,198,496
MIX PUMPING ATTACHMENT FOR FROZEN
CONFECTION FREEZERS
Johnny R. Stapleton, 907 Ayers, Coffeyville, Kans.
Filed Oct. 8, 1962, Ser. No. 229,080
3 Claims. (Cl. 261—26)

This invention relates to a novel and useful mix pumping attachment for frozen confection freezers and more specifically to an attachment which is designed primarily for operative association with a mix can and to be used in automatically supplying mix from a mix can which is normally housed within a freezing compartment into the inlet of the barrel of a freezer machine for dispensing frozen confection.

In an ordinary situation, the frozen confection dispensing machine has a reservoir for containing quantities of mix which is to be dispensed by the machine in the form of frozen confection. The reservoir must be filled manually and the mix is delivered to the establishment in a ten gallon can.

As additional mix is needed by the dispensing machine, a portion of the mix is poured from the ten gallon can into a vessel which is then lifted up to the freezer intake for the purpose of pouring the mix from within into the reservoir of the freezer.

Manual loading of the reservoir of the dispensing machine is time-consuming and it involves the removal of the ten gallon can of mix from the refrigerator for the purpose of pouring some of the mix therein into a vessel for transportation to the intake of the dispensing machine. The mix for dispensing from frozen confection machines should be continually chilled and accordingly it is the main object of this invention to provide a mix pumping attachment for frozen confection mix cans which may be removably secured to the can while the can of mix is disposed in a refrigerated compartment and maintained in a chilled condition.

A further object of this invention, in accordance with the immediately preceding object, is to provide a mix pumping attachment in accordance with the preceding object including a pump for pumping the mix from the container to the inlet of the frozen confection dispensing machine and also an air pump for introducing air under pressure into the mix being pumped into the frozen confection dispensing machine whereby the mix may be commingled with air and have its consistency maintained constant at all times with the proper ratio of air and chilled liquid.

Another object of this invention is to provide a mix pumping attachment in accordance with the preceding objects which may be readily disconnected from one mix can and operatively connected to another with a minimum amount of effort and expenditure of time.

Still another object of this invention is to provide a mix pumping attachment including means which will automatically actuate said attachment to replenish the supply of mix in an associated frozen confection dispensing machine by sensing a reduction of line pressure in the delivery line to the dispensing machine inlet.

A final object to be specifically enumerated herein is to provide a mix pumping attachment in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
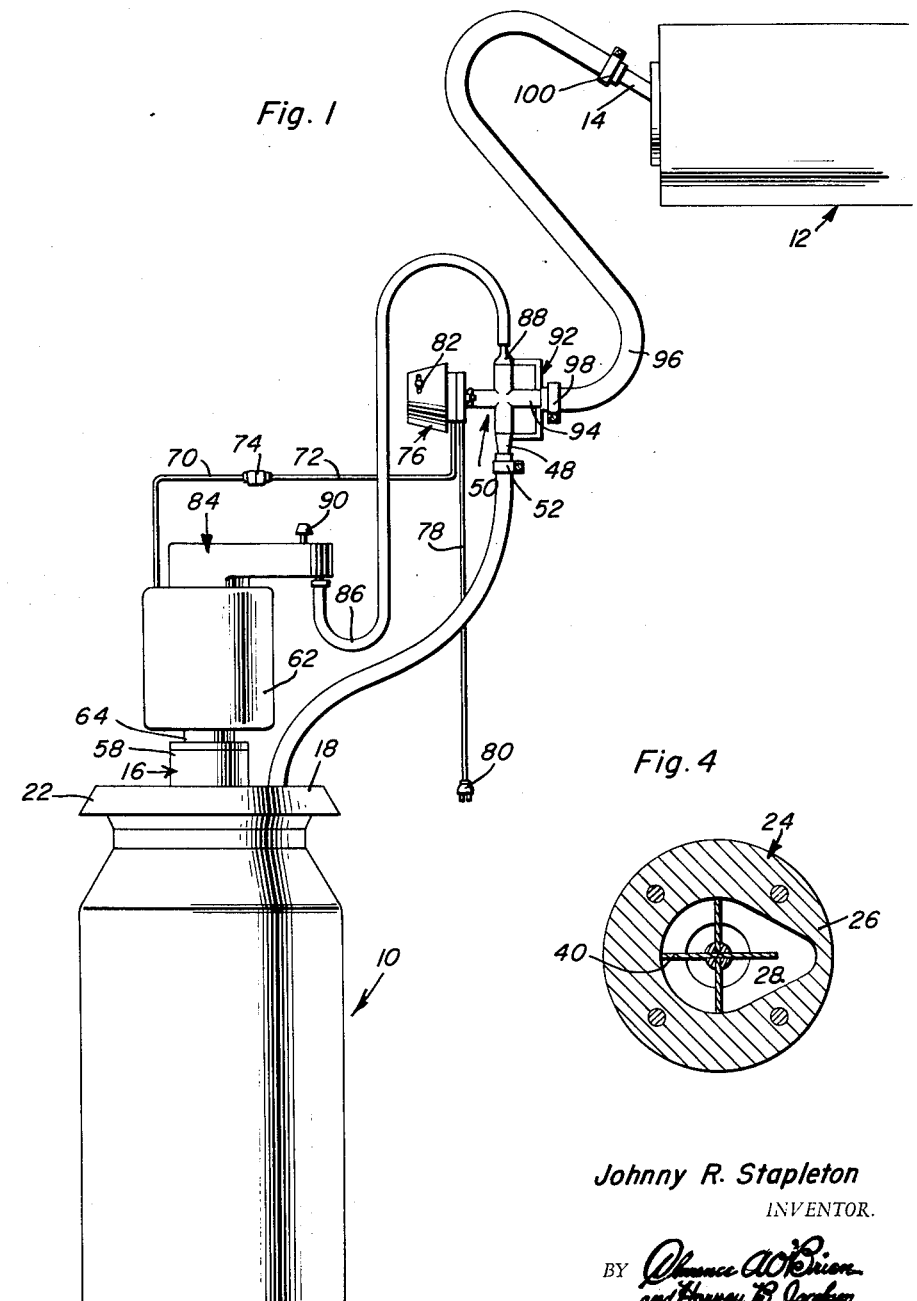
FIGURE 1 is a side elevational view of the mix pumping attachment of the instant invention shown operatively connected to a mix can and the barrel mix inlet of a frozen confection dispensing machine.
Figure 4:
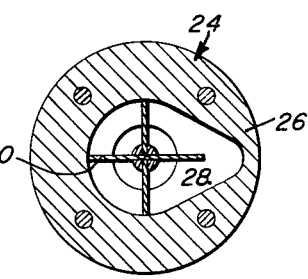
FIGURE 4 is an enlarged horizontal sectional view taken substantially upon the plane indicated by the section line 4—4 of FIGURE 2.
Figure 2:
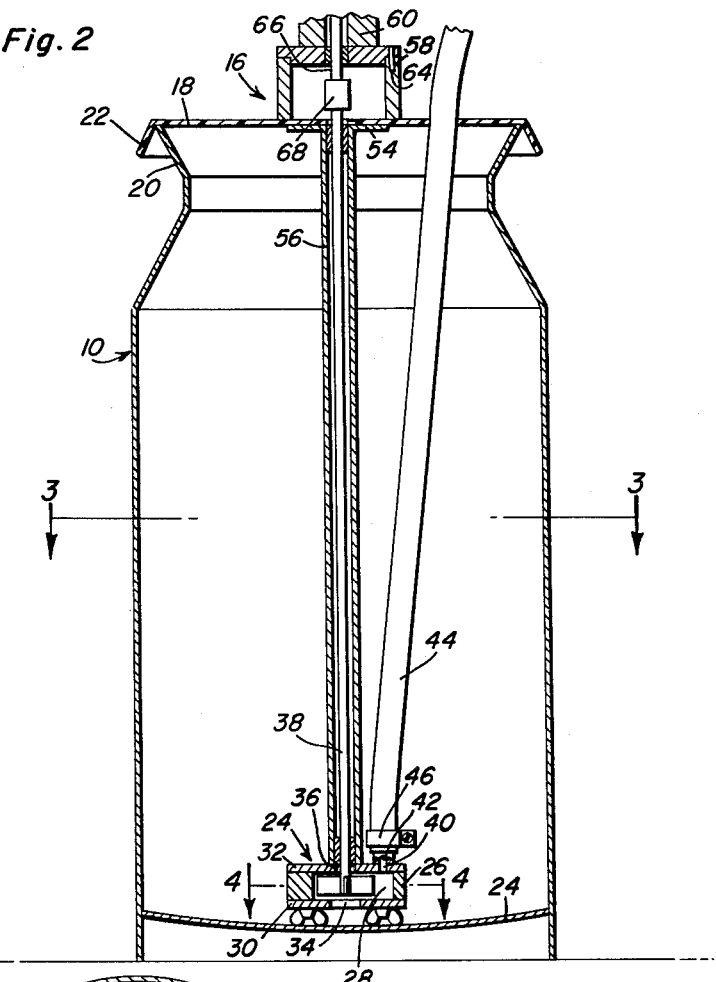
FIGURE 2 is a fragmentary sectional view taken substantially upon a plane passing through the longitudinal centerline of the mix can.
Figure 3:
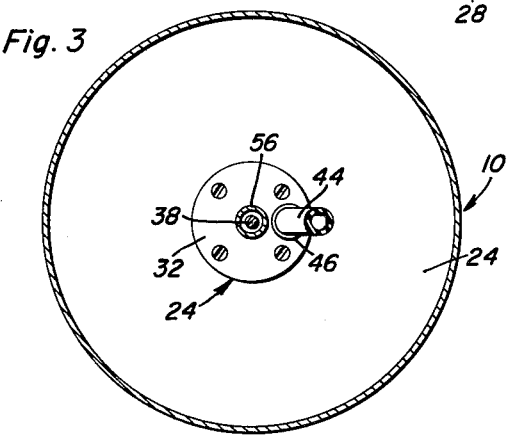
FIGURE 3 is a horizontal sectional view taken substantially upon the plane indicated by the section line 3—3 of FIGURE 2.

Referring now more specifically to the drawings the numeral 10 generally designates a conventional form of mix can while the reference numeral 12 generally designates the reservoir barrel of a conventional form of frozen confection dispensing machine which may be seen to include an inlet neck 14.

The mix pumping attachment of the instant invention is generally designated by the reference numeral 16 and includes a cover 18 for overlying engagement with the open end of the neck 20 of the mix can 10.

The cover 18 includes a downwardly and outwardly inclined flange 22 which extends about the outer periphery of the cover 18 and depends therefrom, and it may be seen that the downwardly and outwardly inclined flange 22 prevents shifting of the cover 18 laterally of the longitudinal axis of the mix can 10. The mix can 10 is conventionally provided with a dished bottom wall 24 and it may be seen that the attachment 16 includes a mix pump generally referred to by the reference numeral 24.

The mix pump 24 comprises a generally cylindrical housing 26 having a central cavity 28 formed therethrough. A pair of end walls 30 and 32 are secured together and embracingly engage the housing 26 from opposite ends. The end wall 30 has an inlet opening 34 formed therein and the end wall 32 has an opening 36 formed therein through which the drive shaft 38 of the pump extends. A rotor 40 is secured to the lower end of the drive shaft or input shaft 38 and it may be seen that the end wall 32 also includes an outlet opening 40 formed in an outlet neck 42.

An outlet conduit 44 has one end secured to the outlet neck 42 by means of a clamp 46 and the end of the outlet conduit 44 remote from the outlet neck 42 is secured to an inlet 48 of a mixing fitting assembly generally referred to by the reference numeral 50 by means of a clamp 52.

The cover 18 has an opening 54 formed therethrough through which the upper end of the drive or input shaft 38 extends and it may be seen that the mix pump 24 is supported by means of a tubular standard 56 which has its lower end secured to the end wall 32 and its upper end secured to the undersurface of the closure cover 18 in any convenient manner.

A cylindrical base 58 is secured to the upper surface of the cover 18 and the lower end of the housing 60 of a motor 62 is keyed to the base 58 by means of a removable pin 64. The motor 62 includes an output shaft 66 which is drivingly coupled to the input shaft 38 by means of a connection 68 and the electric motor 62 receives its source of electrical potential by means of conductor means 70 which is removably coupled to a second conductor means 72 by means of a separable connection 74. The conductor means 72 is in turn electrically connected to a pressure actuated switch assembly 76 for electrically connecting the conductor means 72 with the conductor means 78. It may be seen that the conductor means 78 is provided with the usual type of male plug 80 for connection with a suitable source of electrical potential. The pressure switch 76 is provided with an adjustment screw 82 whereby the pressure level of the air and mix within the mixing fitting assembly 50 effecting actuation of the pressure switch 76 may be adjusted.

The output shaft 66 of the electric motor 62 is also drivingly coupled to an air pump generally referred to by the reference numeral 84 and the air pump 84 is provided with an outlet line 86 which is in turn also coupled to an inlet 88 of the mixing fitting assembly 50. The discharge of the air pump 84 is provided with an adjustable air valve actuator 90 whereby the amount and pressure of the air discharged by the air pump 84 may be adjusted.

The mixing fitting assembly 50 is provided with a mounting bracket 92 for the mounting of the mixing fitting assembly to the wall of the refrigerator in which the mix can 10 is disposed. In addition, the mixing fitting assembly 50 includes an outlet 94 for mix and compressed air to which one end of a flexible conduit 96 is secured by means of a clamp 98. The other end of the flexible conduit 96 is clamped to the mix inlet neck 14 of the barrel 12 by means of clamp 100.

In operation, the mix pumping attachment 16 is operatively connected to the mix can 10 as hereinbefore set forth. Then, as mix is needed within the barrel 12, the air pressure switch 76 will sense a reduction of pressure within the flexible conduit 96 and the mixing fitting assembly 50. This will actuate the pressure switch 76 and in turn effect actuation of the electric motor 16 causing mix to be pumped from the can 10 through the valve 50 while at the same time air is pumped by the air pump 84 to the mixing fitting assembly 50. As soon as the proper pressure in the mix inlet neck 14 and flexible conduit 96 has been reached, the pressure switch 76 will terminate actuation of the electric motor 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mix pumping attachment for frozen confection freezers including a mix inlet and in combination with a mix can for containing mix to be pumped into said inlet, said can including a large diameter generally cylindrical neck being open at its free end, said pumping attachment including a cover for said open end of said neck removably positioned thereover, a mix pump supported from said cover disposed adjacent the bottom of said can, and including an input shaft extending upwardly through said cover, motor means supported from the outer side of said cover and drivingly connected to said input shaft, said pump including an inlet and an outlet to which one end of an outlet conduit is communicated, said outlet conduit extending upwardly through said cover, an air pump including an inlet and outlet and supported from said cover and driven by said motor means, an outlet conduit having one end communicated with said air pump outlet, a mixing fitting assembly including a pair of inlets and an outlet, the outer ends of said outlet conduits being communicated with said pair of inlets, means adapted to communicate said mixing fitting assembly outlet with said mix inlet, said mixing fitting assembly including means for actuating the mix pump motor means in response to air pressure changes in said mixing fitting assembly said cover including means engageable with said neck to prevent shifting of said cover laterally of said neck the last mentioned means comprising a downwardly and outwardly inclined circumferential depending flange carried by the outer marginal portions of said cover, said flange and cover being of one-piece construction.

2. The combination of claim 1 wherein said actuating means includes means for selecting the air pressure level at which said motor means will be actuated.

3. The combination of claim 2 wherein said mix pump includes a tubular standard fixed at one end to said pump and at the other end to said cover, said input shaft extending through said standard.

References Cited by the Examiner

UNITED STATES PATENTS

| | | | |
|---|---|---|---|
| 1,446,800 | 2/23 | Hurd | 103—6 |
| 1,814,454 | 7/31 | Penn. | |
| 2,146,706 | 2/39 | Ballman | 103—6 |

M. CARY NELSON, *Primary Examiner.*